United States Patent [19]

Godard et al.

[11] 4,320,517
[45] Mar. 16, 1982

[54] METHOD AND DEVICE FOR EFFECTING THE INITIAL ADJUSTMENT OF THE CLOCK IN A SYNCHRONOUS DATA RECEIVER

[75] Inventors: Dominique N. Godard, Le Rouret; Michel Y. Quintin, La Gaude, both of France

[73] Assignee: International Business Machines Corp., Armonk, N.Y.

[21] Appl. No.: 156,140

[22] Filed: Jun. 3, 1980

[30] Foreign Application Priority Data

Mar. 19, 1980 [FR] France ............................ 80 06542

[51] Int. Cl.³ ............................................. H04L 7/10
[52] U.S. Cl. ........................................ 375/13; 375/14; 375/114; 333/18
[58] Field of Search ............................ 375/11-15; 328/72, 74; 333/18

[56] References Cited

U.S. PATENT DOCUMENTS

| 3,868,603 | 2/1975 | Guidoux | 375/15 |
| 3,978,407 | 8/1976 | Forney et al. | 375/13 |
| 4,006,352 | 2/1977 | Sato | 375/13 |
| 4,253,186 | 2/1981 | Godard | 375/15 |

*Primary Examiner*—Benedict V. Safourek
*Assistant Examiner*—Stephen Chin
*Attorney, Agent, or Firm*—John B. Frisone

[57] ABSTRACT

In a synchronous data receiver that includes a clock and an adaptive equalizer, a method and a device for effecting the initial adjustment of the clock during a turn-on period in the course of which the receiver is supplied with a known clock synchronization signal followed by a known equalizer training sequence. In accordance with the method of invention, the incoming signal is sampled and the samples so obtained are stored in a storage means. The synchronization signal and the beginning of the training sequence are successively detected. When the beginning of the training sequence is detected, the storage locations for the samples of the received synchronization signal are known and a control signal controlling the initial adjustment of the clock is derived from these samples, which are stored in predetermined locations in the storage means. In a preferred embodiment of the invention, said control signal is derived from the samples that precede the G samples immediately followed by the beginning of the training sequence, the value of G being such that those samples which are in the vicinity of the transition region between the synchronization signal and the training sequence will not be used.

8 Claims, 3 Drawing Figures

METHOD AND DEVICE FOR EFFECTING THE INITIAL ADJUSTMENT OF THE CLOCK IN A SYNCHRONOUS DATA RECEIVER

DESCRIPTION

Technical Field

This invention relates to synchronous digital data transmission systems and, more particularly, to a method and a device for effecting the initial adjustment of the clock in a data receiver comprising an adaptive equalizer. This invention is particularly suitable for effecting the initial adjustment of receiver clocks in a data transmission system configured as a multipoint network.

Background Art

In a synchronous digital data transmission system, the sequence of bits to be transmitted is first converted into a sequence of symbols. These symbols are then transmitted one at a time at instants called signaling instants, which have a T-second spacing and are determined by the transmitter clock, by using a carrier wave modulation technique wherein each symbol is caused to correspond to a discrete value of one or more characteristics (e.g., amplitude, phase) of the carrier wave. The modulated carrier wave is sent over the transmission channel. The modulated carrier is representative of the data at the signaling instants only, and it is essential, in order for the data to be correctly detected, that the receiver include an accurate clock indicating the signalling instants at which the signal received from the transmission channel is to be sampled. The phase and frequency of the receiver clock must be continuously adjusted to optimize the sampling instants of the received data signal and to compensate for phase and frequency variations between this clock and that of the transmitter.

The adjustment of the receiver clock actually involves two distinct operations, namely, an operation performed to maintain synchronization, and so-called initial adjustment operation.

The former operation is carried out during the transmission of data. During this phase, the receiver clock is continuously adjusted in accordance with a timing information derived from the received data signal.

The initial adjustment operation is performed during a turnon period, before transmission of the data proper takes place. Generally, each data message is preceded by a known clock synchronization signal sent by the transmitter and from which a control signal is derived by the receiver to adjust its clock. It will be seen that, to obtain a satisfactory throughput, it is essential that the duration of the synchronization signal be as short as possible compared with that of the data message. In systems in which the duration of tthe data messages is very long, the duration of the synchronization signal is not critical. However, in certain systems such as multipoint systems, the duration of the synchronization signal must be very short for the reasons outlined below.

In a data transmission system configured as a multipoint network, several data terminals exchange data over a common transmission line. Each data terminal is connected to the common line through a modem comprising a data transmitter and a data receiver. All data terminals do not have the same degree of intelligence and in general one of them, usually a computer, controls the entire network, with the transmission of data taking place between this computer and the other data terminals. One of the characteristics of these systems is that many of the messages from the data terminals consist of brief answers to requests initiated by the computer and are, consequently, very short, so that such systems require a very short synchronization signal.

To use a short duration synchronization signal, it is necessary that the receiver be provided with a device capable of effecting a very fast initial adjustment of the clock.

European patent application No. 79430002.0 (publication No. 0003943) describes a method for effecting a fast initial adjustment of the receiver clock, which involves the use of a synchronization signal whose spectrum includes two components at frequencies $f_1 = f_c - 1/2T$ and $f_2 = f_c + 1/2T$, where $f_c$ is the carrier frequency and $1/T$ is the signaling rate. In said method, the initial phase of the clock is determined by computing the phase of the coefficient that corresponds to the frequency $1/T$ of the discrete Fourier transform of a predetermined number of samples of the synchronization signal multiplied by itself. The method briefly described above enables the receiver clock to be adjusted using a very short synchronization signal. For example, in the case of data transmitted at 9600 bits per second (bps) with a signalling rate equal to 2400 Hz, the clock can be adjusted by means of a synchronization signal comprising 12 symbols only. However, while the above method makes it possible to adjust the clock through the use of a synchronization signal comprising, for example, p symbols only, the prior art techniques require the use of a synchronization signal comprising far more than p symbols, that is, signal whose duration is much longer than that of the p symbols. To use a synchronization signal comprising p symbols only in conjunction with an adjustment technique that requires the use of a synchronization signal comprising p symbols, it is necessary that the beginning of the signal be detected vary accurately by the receiver and that the received p symbols be undistorted if the adjustment techniques is to work satisfactorily. Such is seldom the case in prior art receivers and, for this reason, a synchronization signal comprising far more than p symbols is used.

SUMMARY OF THE INVENTION

It is, therefore, an object of this invention to provide a method and a device for effecting the initial adjustment of the clock in a synchronous data receiver by means of synchronization signal having as short a duration as possible.

This and other objects are generally attained through the use of the method of the present invention whereby, in a synchronous data receiver that includes a clock and an adaptive equalizer, the initial adjustment of the clock can be effected during a turn-on period in the course of which the receiver is supplied with a known clock synchronization signal followed by a known equalizer training sequence. In accordance with the present method, the incoming signal is sampled and the samples so obtained are stored in a storage means. The synchronization signal and the beginning of the training sequence are successively detected. When the beginning of the training sequence is detected, the storage locations for the samples of the received synchronization signal are known and a control signal controlling the initial adjustment of the clock is derived from the these samples, which are stored in predetermined locations in the storage means.

In a preferred embodiment of the invention, said control signal is derived from the samples that precede the G samples immediately followed by the beginning of the training sequence, the value of G being such that those samples which are in the vicinity of the transition region between the synchronization signal and the training sequence will not be used.

In another embodiment, whenever the receiver uses a synchronization signal whose frequency spectrum includes three distinct components at frequencies $f_c$, $f_1$ and $f_2$, where $f_c$ is the carrier frequency and $f_1$ and $f_2$ are defined as $$f_1 = f_c - 1/2T \text{ and } f_2 = f_c + 1/2T$$

$1/T$ being the signaling rate, said control signal is derived from the absolute values of the samples of the filtered input signal.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
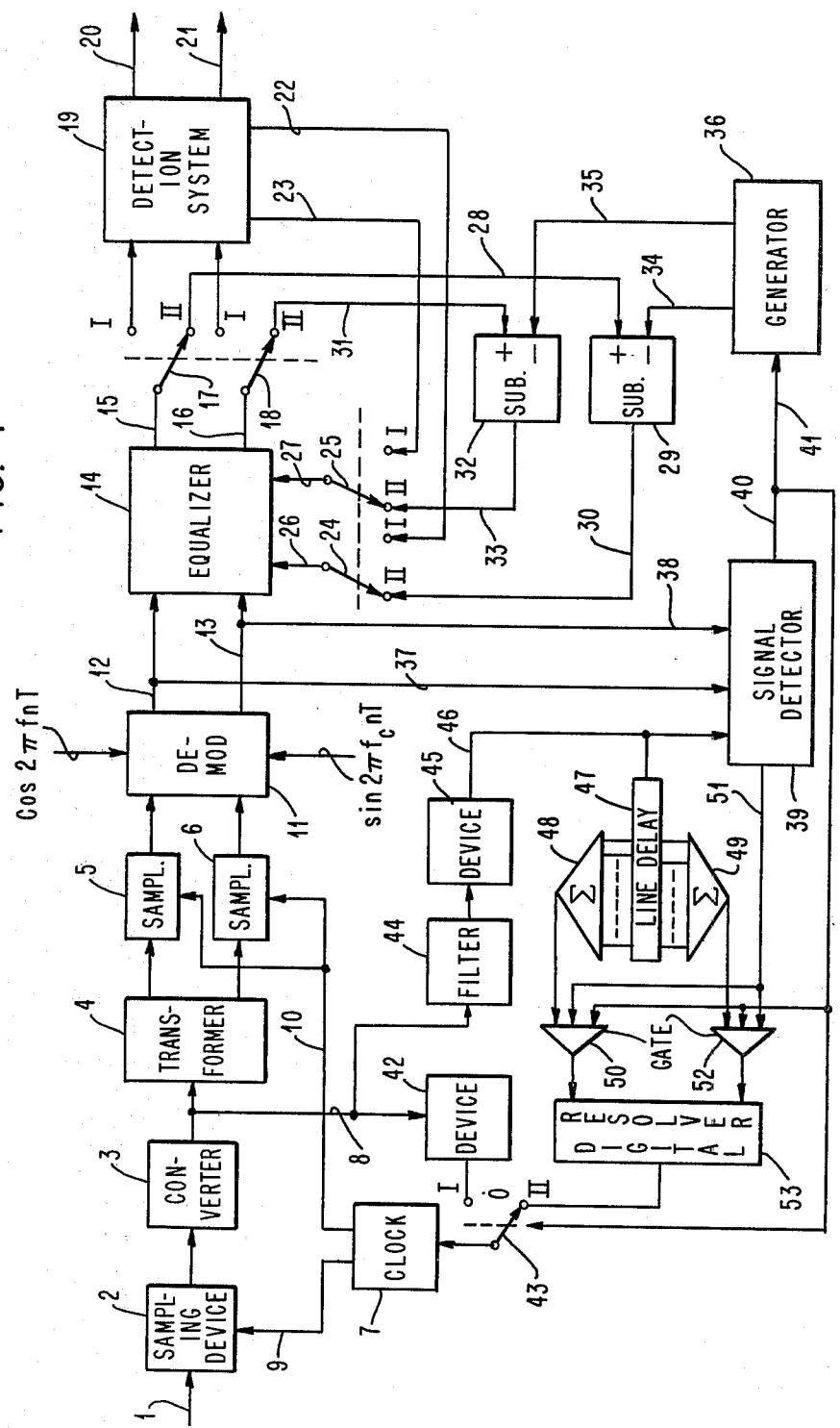
FIG. 1 is a block diagram of a receiver incorporating the present invention.

In order to illustrate the context within which the present invention finds application, there is shown in FIG. 1 a block diagram of a typical 9600 bps receiver which is in accordance with CCITT Recommendation V29 and incorporates the invention. This receiver uses double sideband-quadrature carrier (DSB-QC) modulation. The term DSB-QC modulation is used here is a broad sense and encompasses all systems wherein the transmitted signal can be represented by superimposing two amplitude modulated quadrature carriers. Thus, the term DSB-QC modulation includes phase-shift keying modulation, amplitude phase-shift keying modulation, and quadrature amplitude modulation. The signal received from the transmission channel and the energy of which has been normalized by an automatic gain control (AGC) circuit (not shown), is applied via a line 1, after being passed through a band-pass filter (not shown) which rejects the out-of-band noise, to a sampling device 2 in which it is sampled at a rate $1/\tau$. The selected rate $1/\tau$ is equal to a multiple $m/T$ of the signaling rate $1/T$ in order that a sufficient number of samples may be obtained at the output of the device 2 to provide an adequate definition of the received signal. The value of the amplitude of these samples is converted to digital form in an analog-to-digital converter 3 and inputted to a digital Hilbert transformer 4.

A Hilbert transformer is a one-input, two-output device which supplies on its respective outputs the in-phase and quadrature components of an input signal applied thereto. An exemplary digital embodiment of such a device is described in an article entitled "Theory and Implementation of the Discrete Hilbert Transformer", by L. R. Robiner and C. M. Rader, in *Digital Signal Processing*, IEEE Press, 1972.

The in-phase and quadrature components of the input signal applied to the Hilbert transformer 4 are respectively resampled at the signaling rate $1/T$ by two sampling devices 5 and 6. A clock comprised of a digital phase-locked oscillator (PLO) 7 has its input connected via a line 8 to the output of the analog-to-digital converter 3 and controls the sampling device 2 via a line 9, the sampling devices 5 and 6 via a line 10, and all other components of the receiver via lines not shown. A digital PLO is a well-known device which usually comprises a quartz oscillator providing a high-frequency sine wave. This sine wave is converted into a square wave and applied to a chain of dividers which supply pulses at the desired frequency. The phase of these pulses can be varied by varying the division ratios in the chain of dividers in accordance with the signal applied to the control input of the PLO. The in-phase and quadrature components, respectively obtained at the output of the sampling devices 5 and 6, of the received signal are applied to the inputs of a complex demodulator 11. The demodulator 11 receives from a local source (not shown) an in-phase carrier of the form $\cos 2\pi f_c nT$ and a quadrature carrier of the form $\sin 2\pi f_c nT$, where $f_c$ is the carrier frequency and n is a positive integer that varies between zero and infinity. If the signal received at the signaling instant $nT$ is designated $r_n$, the in-phase and quadrature components thereof respectively available at the output of the sampling devices 5 and 6 be expressed as $r_{i,n}$ and $r_{q,n}$, respectively. The demodulator 11 provides on the lines 12 and 13 the in-phase and quadrature components $y_{i,n}$ and $y_{q,n}$, respectively, of the demodulated signal $y_n$, in accordance with the well-known relations:

$$y_{i,n} = r_{i,n} \cos \omega_c t + r_{q,n} \sin \omega_c t \qquad (1)$$

$$y_{q,n} = -r_{i,n} \sin \omega_c t + r_{q,n} \cos \omega_c t \qquad (2)$$

The in-phase and quadrature components of the demodulated signal available on the lines 12 and 13 are applied to the inputs of an adaptative complex transversal equalizer 14, an exemplary embodiment of which is described in French Pat. No. 73-26404 filed by the present applicant July 12, 1973 (publication No. 2,237,379).

The in-phase and quadrature components of the equalized signal are respectively applied via lines 15 and 16 to the common input of a couple of two-position switches 17 and 18. Positions I of these switches are connected to the inputs of a data detection system 19 which provides on its output lines 20 and 21 the in-phase and quadrature components, respectively, of the detected data symbols. The system 19 also supplies on its output lines 22 and 23 the in-phase and quadrature components of an error signal representative of the difference between the components of the equalized signal and those of the detected data symbol corresponding thereto. An exemplary embodiment of a data detection system is described in French Pat. No. 74-43560 filed by the present applicant Dec. 27, 1974 (publication No. 2,296,322). Lines 22 and 23 are respectively connected to positions I of a couple of two-position switches 24 and 25 whose outputs are respectively connected to the equalizer 14 via lines 26 and 27. Position II of the switch 17 is connected via a line 28 to the (+) input of a subtractor 29 which has its output connected to position II of the switch 24 via a line 30. Position II of the switch 18 is connected via a line 31 to the (+) input of a subtractor 32 which has its output connected to position II of the switch 25 via a line 33. The (−) inputs of the subtractors 29 and 32 are connected via lines 34 and 35, respectively, to the output of a generator 36 of reference training sequences. The lines 12 and 13 are also connected through a couple of switches 37 and 38 to the inputs of a signal detector 39, which will be described in detail with reference to FIG. 3. The output 40 of the detector 39 is connected to the generator 36 via a line 41, and to the switches 17, 18, 24 and 25 via lines not shown.

The output from the analog-to-digital converter 3 is also supplied to a device 42 which is used to maintain synchronization and whose output is connected to position I of a three-position switch 43. Many devices for maintaining synchronization are currently available. For example, device 42 may take the form of any one of the devices described in French Pat. No. 75-14020 (publication No. 2,309,089) with reference to FIGS. 3, 6 and 7 thereof. The output of the switch 43 is connected to the control input of the PLO 7.

The output from the converter 3 is further supplied to a notch filter 44 which is centered at frequency $f_c$ and rejects that frequency. Typically, the transfer function of such a filter is:

$$1 - (2\cos 2\pi f_c \tau)Z^{-1} + Z^{-2}$$

The output from the filter 44 is fed to a device 45 whose function is to determine absolute values. The device 45 has its output connected via a line 46 to the signal detector 39 and to the input of a digital delay line 47. The delay line 47 is comprised of a 66-stage shift register. Each of these stages can store the absolute value of a sample in digital form, and the content of the shift register is shifted from right to left (in the example shown in the Figure) at the sampling rate $1/\tau$. The outputs of the $19^{th}$, $21^{st}$, ..., $65^{th}$ stages are connected to the inputs of a summing device 48 while the outputs of the $20^{th}$, $22^{nd}$, ..., $66^{th}$ stages are connected to the inputs of a summing device 49. The output of the summing device 48 is connected to one input of a gate 50 which has its other inputs respectively connected to the outputs 40 and 51 of the signal detector 39. The output of the summing device 49 is connected to one input of a gate 52 which has its other inputs respectively connected to the outputs 40 and 51 of the signal detector 39. The outputs of the gates 50 and 52 are connected to the two inputs of a digital resolver 53. A resolver is a well-known device which receives as inputs the values of the sine and cosine of an angle and supplies the value of that angle. A detailed description of a digital resolver will be found, for example, in French Pat. No. 71-47850 (publication No. 2,164,544). The output of the resolver 53 is connected to position II of the switch 43, the third position of which, position 0, is not connected. The switch 43 is controlled, in particular, by the signal obtained at the output 40 of the signal detector 39.

It will be assumed here that the receiver of FIG. 1 receives data messages and that each of these is preceded by a preamble comprising a clock synchronization signal followed by an equalizer training sequence.

Initially, the switch 43 is set to position 0 and the switches 17, 18, 24 and 25 are all set to position I. The synchronization signal is received first. This signal is sampled at the rate $1/\tau$ by the device 2 and converted to digital form by the converter 3, and the samples of the signal are successively loaded into the delay line 47 after they have been passed through the filter 44 and rectified by the device 45. The Hilbert transformer 4 provides the in-phase and quadrature components of the synchronization signal which are respectively sampled at the rate $1/T$ in the devices 5 and 6 and are then demodulated in the demodulator 11 and fed to the signal detector 39. The outputs from the equalizer 14 and the data detection system 19 are ignored.

When the signal detector 39 detects the synchronization signal, its output 51 goes high. The receiver then receives the equalizer training sequence, which is similarly applied to the signal detector 39.

Upon detecting the training sequence, the output 40 of the signal detector 39 goes high, thereby inhibiting the gates 50 and 52 and causing the setting of the switch 43 to change to position II, and the device for performing the initial adjustment of the clock (comprising in particular the summing devices 48 and 49 and the resolver 53) derives from the samples stored in the delay line 47 a control signal which is applied to the control input of the PLO 7 through the switch 43 (set to position II), as will be explained in more detail later. In addition, the positive-going transition of the output 40 causes the setting of the switches 17, 18, 24 and 25 to change to position II and initiates the initial adjustment process for the equalizer 14; this process is known per se and will not be described in detail hereafter. At each signaling instant, the in-phase and quadrature components of each of the symbols in the reference sequence are simultaneously provided by the generator 36 on the lines 34 and 35. These components are respectively subtracted from the in-phase and quadrature components of the equalized signal by the substractors 29 and 32 to provide the in-phase and quadrature components of the error signal applied to the equalizer 14 via the lines 30 and 33 and the switches 24 and 25, both of which are set to position II. The coefficients of the equalizer are adjusted as a function of the error signal thus obtained.

When the data message is supplied to the receiver, the switches 17, 18, 24, 25 and 43 are all set to position I. The received signal whose in-phase and quadrature components are respectively available at the output of the sampling devices 5 and 6 is demodulated in the demodulator 11 and equalized in the equalizer 14, and its in-phase and quadrature components are then applied to the data detection system 19 through the switches 17 and 18, both of which are set to position I. At each signaling instant, the detection system 19 provides the components of the detected symbol on the output lines 20 and 21 and the components of the error signal on the output lines 22 and 23. The latter components are applied through the switches 24 and 25, both of which are set to position I, to the equalizer 14, which derives therefrom control signals used to adjust its coefficients. The device 42 assures that the clock remains synchronized.

Figure 2:
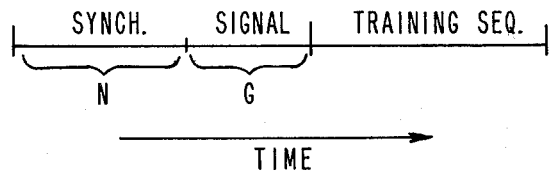
FIG. 2 illustrates a synchronization signal followed by a training sequence.

The initial adjustment of the clock will now be described in detail. It will be assumed that the method used by the device which effects the initial adjustment of the clock requires that the duration of the synchronization signal be equal to p times the signaling period T. In the receiver shown in FIG. 1, the incoming signal is sampled by the device 2 at a rate equal to m times the signaling rate, and a synchronization signal of said duration will be received as a sequence of $N = p \times m$ samples. In accordance with the invention, the length of the delay line 47 should be such as to enable at least N samples to be stored therein. Thus, if the delay line 47 has N stages, when the beginning of the equalizer training sequence is detected by the signal detector 39, the N samples stored in the delay line 47 will be known to be synchronization signal samples from which the control signal controlling the initial adjustment of the clock can be derived. However, the incoming signal may be affected by transient phenomena when the transition between the synchronization signal and the equalizer training sequence occurs; as a result, those samples of the received synchronization signal which precede the beginning of the training sequence may be distorted and should preferably not be used for deriving said control signal. In a preferred embodiment of the invention, a predetermined number G of samples that immediately precede the beginning of the training sequence (see FIG. 2) are not used for deriving the control signal. Accordingly, the delay line should comprise at least N+G stages, so that when the beginning of the training sequence is detected by the signal detector 39, said control signal will be derived from the N samples stored in the delay line which precede the newest G samples.

In FIG. 1, there is shown by way of example a device for effecting the initial adjustment of the clock that is derived from the device described in the aforementioned European patent application. Briefly, the device described in said patent application computes the real part, Re $C_o$, and the imaginary part, Im $C_o$, of coefficient $C_o$, at frequency 1/T, of the discrete Fourier transformer of the signal s(kτ) in accordance with the following relations:

$$Re\ C_o = \sum_{k=0}^{N-1} s(k\tau) \cos \frac{2\pi}{T} k\tau \quad (3)$$

$$Im\ C_o = -\sum_{k=0}^{N-1} s(k\tau) \sin \frac{2\pi}{T} k\tau \quad (4)$$

The quantities Re $C_o$ and Im $C_o$ are then applied to a resolver which derives therefrom the value of the angle by which the phase of the clock is to be varied to achieve a fast synchronization and this value is applied to the PLO 7 as a control signal. The signal s(kτ) is the received synchronization signal that is sampled and multiplied by itself, and the synchronization signal consists of a signal whose frequency spectrum includes two components at the frequencies $$f_1 = f_c - 1/2T \text{ and } f_2 = f_c + 1/2T$$

where $f_c$ is the carrier frequency.

The receiver of FIG. 1 uses a synchronization signal which consists of successive alternations between two predetermined symbols and which is in accordance with CCITT Recommendation V29. This signal has a frequency spectrum comprised of three components at the frequencies $f_c$, $f_1$ and $f_2$ defined above and, consequently, meets the requirements of the device described in the aforementioned European patent application. Instead of signal s(kτ), the illustrated device uses the equivalent signal, x(kτ), which is the absolute value, provided by the device 45, of the incoming signal. The effect of the filter 44, to be described later, can be ignored at this stage.

Putting τ=T/4, the direct application of relations (3) and (4) to the present invention would give:

$$Re\ C_o = \sum_{k=0}^{N-1} x(k\tau) \cos \frac{k\pi}{2} \quad (5)$$

$$Im\ C_o = -\sum_{k=0}^{N-1} x(k\tau) \sin \frac{k\pi}{2} \quad (6)$$

In relations (5) and (6), the sample x(o) which corresponds to k=o is the newest sample of the received signal, and the sample x((N−1)τ) which corresponds to k=N−1 is the oldest sample. In this invention, the N samples contained in the delay line that precede the newest G samples are used. If the input of the delay line is chosen as point of origin, the sample contained in its $k^{th}$ stage will be designated $x_k$.

Taking this change of origin into account and noting that the sample $x_{k-1}$ is newer than the sample $x_k$, relations (5) and (6) can be written:

$$Re\ C_o = \sum_{k=1}^{N} x_{G+k} \cos \frac{k\pi}{2} \quad (7)$$

$$Im\ C_o = \sum_{k=1}^{N} x_{G+k} \sin \frac{k\pi}{2} \quad (8)$$

Note that relations (7) and (8) reduce to $$Re\ C_o = -\sum_{k=0}^{N/2-1} (-1)^k x_{G+2+2k} \quad (9)$$

$$Im\ C_o = \sum_{k=0}^{N/2-1} (-1)^k x_{G+1+2k} \quad (10)$$

In the example shown in FIG. 1, we chose N=46 and G=18. Accordingly, relations (9) and (10) become $$Re\ C_o = -\sum_{k=0}^{23} (-1)^k x_{20+2k} \quad (11)$$

$$Im\ C_o = \sum_{k=0}^{23} (-1)^k x_{19+2k} \quad (12)$$

In the device of FIG. 1, and according to relations (11) and (12), the samples $x_{20}$, $x_{22}$, ..., $x_{26}$ are respectively supplied to (−), (+), ..., (+) inputs of the summing device 48, which provides the quantity Re $C_o$. Similarly, the samples $x_{19}$, $x_{21}$, ..., $x_{65}$ are supplied to (+), (−), ..., (−) inputs of the summing device 49, which provides the quantity Im $C_o$. The quantities Re $C_o$ and Im $C_o$ are supplied to the resolver 53, which derives therefrom the value of the angle by which the phase of the PLO 7 is to be varied. It will be understood by those skilled in the art that, although the gates 50 and 52 have been shown in FIG. 1 as being located at the input of the resolver 53, these could be replaced by a single gate located at the output of the resolver 53, and that the gates 50 and 52 are but an example of the means which may be used to selectively apply the control signal to the PLO 7.

Figure 3:
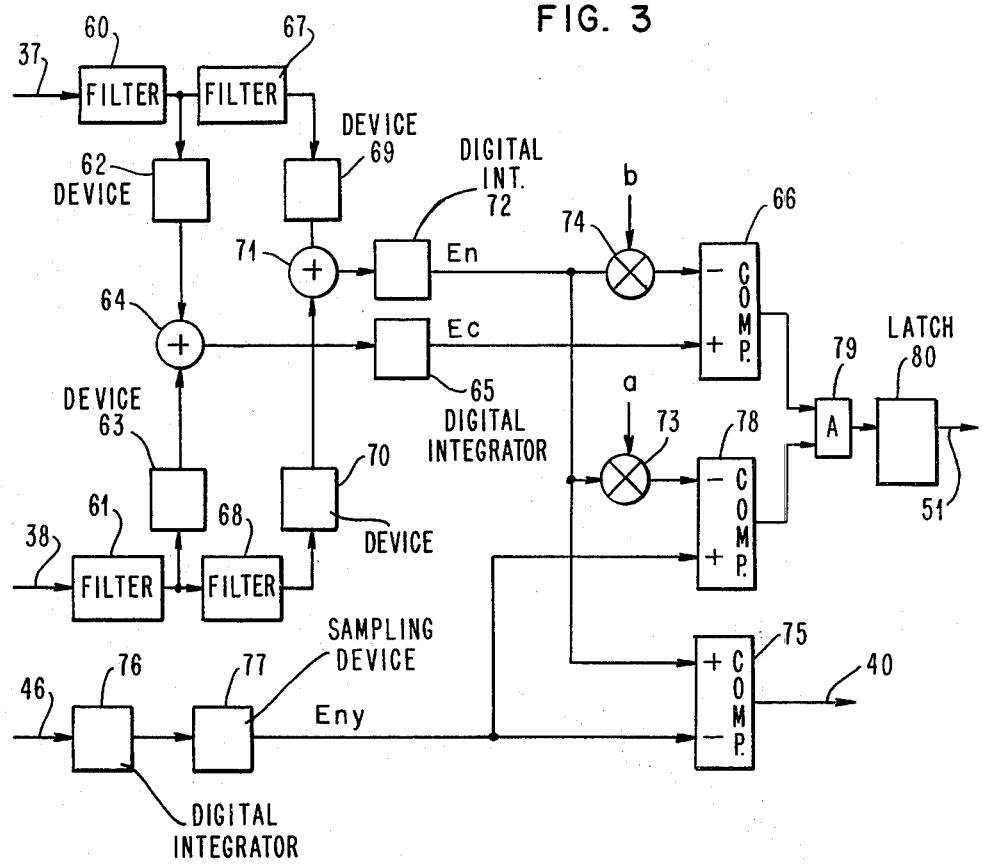
FIG. 3 shows an exemplary embodiment of the signal detector 39 of FIG. 1.

Referring now to FIG. 3, the signal detector 39 will be described in detail. It will be assumed, by way of example, that the turn-on sequence received by the receiver of FIG. 1 includes the synchronization signal described earlier, followed by an equalizer training sequence pertaining to the family of so-called "CAZAC sequences", some examples of which are given in French patent application No. 75-40417 (publication No. 2,337,465).

A CAZAC sequence has a frequency spectrum comprised of constant-amplitude components that extends over the entire bandwidth of the transmission channel.

The signal detector 39 shown in detail in FIG. 3 detects the synchronization signal and the training sequence by using their spectral characteristics. As shown in FIG. 3, the outputs of the demodulator 11 are respectively connected via lines 37 and 38 to the input of two identical notch filters 60 and 61, each of which is centered at frequency 1/2T Hz and rejects that frequency. Typically, the transfer function of each of these filters is $(1+Z^{-1})$. The outputs from the filters 60 and 61 are respectively supplied to a couple of devices 62 and 63 whose function is to determine absolute values and whose outputs are respectively connected to the inputs of a binary adder 64. The adder 64 has its output connected to a digital integrator 65 whose output is supplied to the (+) input of a comparator 66.

The outputs from the filters 60 and 61 are also supplied, respectively, to a couple of identical notch filters 67 and 68, which reject the DC component. Typically, the transfer function of each of these filters is $(1-Z^{-1})$. The outputs from the filters 67 and 68 are respectively supplied to a couple of devices 69 and 70, which are identical to the devices 62 and 63. The outputs from the devices 69 and 70 are supplied to a binary adder 71, which has its output connected through a digital integrator 72 to the inputs of a couple of binary multipliers 73 and 74 and to the (+) input of a comparator 75 whose output is the output 40 from the signal detector 39.

The device 45 (FIG. 1), which is used to determine absolute values, has its output connected via line 46 to a digital integrator 76 whose output is sampled at the signaling rate 1/T in a sampling device 77. The device 77 has its output connected to the (+) input of a comparator 78 and to the (−) input of the comparator 75.

The comparator 78 has its (−) input connected to the output of the multiplier 73, whose other input receives a quantity "a". The comparator 66 has its (−) input connected to the output of the multiplier 74, whose other input receives a quantity "b". The outputs of the comparators 66 and 78 are connected to the inputs of an AND gate 79, whose output is supplied to a latch 80. The output from the latch 80 is the output 51 from the signal detector 39.

As has been seen, the frequency spectrum of the synchronization signal consists of three components at frequencies $f_1$, $f_2$ and $f_c$.

Thus, the synchronization signal can be detected by determining whether components at frequencies $f_1$, $f_2$ and $f_c$ are simultaneously present in the received signal.

After the signal has been demodulated by the carrier of frequency $f_c$ in the demodulator 11, the two components at frequencies $f_1$ and $f_2$ are converted to a signal component at frequency 1/2T and the component at frequency $f_c$ is converted to a DC component. Consequently, the synchronization signal can also be detected by determining whether a DC component and a component at frequency 1/2T are simultaneously present in the demodulated signal.

In the device of FIG. 3, the synchronization signal is detected by using a combination of these two possibilities. One determines whether components at frequencies $f_1$ and $f_2$ are present in the received signal, and the presence of the component at frequency $f_c$ is detected by determining whether a DC component is present in the demodulated signal. The inphase component of the demodulated signal is passed through the filter 60 which rejects its component at frequency 1/2T and the device 62 supplies the absolute value of the output from the filter 60. Similarly, the quadrature component of the demodulated signal is passed through the filter 61 and the device 63 provides the absolute value of the output from the filter 61. These absolute values are added together in the adder 64 and an energy measurement, Ec, is obtained at the output of the integrator 65. The received signal available at the output of the analog-to-digital converter 3 is passed through the filter 44 (FIG. 1) which rejects the component at frequency $f_c$. The device 45 provides the absolute value of the output from the filter 44. The output from the device 45 is supplied via line 46 to the integrator 76 whose output is sampled at the rate 1/T by the sampling device 77 and provides an energy measurement, Eny. In the receiver of FIG. 1, the filter 44 and the device 45 are shown as being located outside of the signal detector 39 because, in a preferred embodiment of the invention, instead of causing the samples of the received signal to be directly loaded into the delay line 47 (FIG. 1), it is deemed preferable to load the delay line 47 with the samples supplied by the device 45 as these are subjected to a lesser amount of distortion due to noise.

The outputs from the filters 60 and 61 are respectively passed through the filters 67 and 68, which reject the DC component, and whose outputs are in turn applied to the devices 69 and 70, which determine the absolute values thereof, respectively. These absolute values are added together in the adder 71 and the integrator 72 provides an energy measurement, En.

When the synchronization signal is received, Eny is a measurement of the energy of the received signal, components at frequencies $f_1$ and $f_2$, Ec is a measurement of the energy of the DC component of the demodulated signal, and En is a noise measurement. The synchronization signal is detected when the following two conditions are satisfied:

$$Eny > a\ En \qquad (13)$$

$$Ec > b\ En \qquad (14)$$

where a and b are parameters whose values are determined in accordance of the signal-to-noise ratio and the anticipated amount of signal distortion within the transmission line at a given speed. Typical values for a transmission at 9600 bps over a conditioned line of the C1 type are a=2 and b=5.

When conditions (13) and (14) are satisfied, the outputs from the comparators 66 and 78 and the output 51 from the signal detector 39 go high.

The device of FIG. 3 makes use of the differences between the spectrum of the training sequence and that of the synchronization signal to detect the training sequence. As mentioned earlier, when the synchronization signal is received, the energy En is representative of noise and the energy Eny is greater than En. When the training sequence is received, the energy En increases suddenly because the frequency spectrum of the sequence extends all over the bandwidth and the filters 60, 61, 67 and 68 only reject the DC component and the component at frequency 1/2T. The training sequence is detected when the energy En exceeds the energy Eny, that is, when the following condition is satisfied:

$$En > Eny \qquad (15)$$

When this condition is satisfied, the output from the comparator 75 and the output 40 from the signal detector 39 go high.

While the invention has been particularly shown and described with reference to a preferred embodiment thereof, it will be understood by those skilled in the art that numerous changes in form and detail may be made therein without departing from the spirit and scope of the invention.

What is claimed is:

1. In a synchronous data receiver of the type that includes a clock and an adaptive equalizer, a method for effecting the initial adjustment of the clock during a turn-on period in the course of which the receiver receives a clock synchronization signal followed by an equalizer training sequence, characterized in that it includes the steps of:
   (a) sampling the received signal,
   (b) storing signal samples derived from the samples of the received signal in a storage means, which includes a plurality of locations, each being capable of storing one of said signal samples,
   (c) detecting the synchronization signal,
   (d) detecting the beginning of the equalizer training sequence after the synchronization signal has been detected, and
   (e) deriving a control signal for controlling the initial adjustment of the clock from the samples stored in predetermined locations in said storage means, starting from the instant the training sequence is detected.

2. A method according to claim 1, characterized in that said samples stored in predetermined locations in said storage means are those samples which precede a given number G of samples which are the newest samples at the instant the beginning of the training sequence is detected.

3. A method according to claim 1 or 2 which is used in a receiver for receiving data transmitted by modulating a carrier of frequency $f_c$ at a signaling rate $1/T$, and employing a synchronization signal whose frequency spectrum includes three distinct components at frequencies $f_c$, $f_1 = f_c - 1/2T$ and $f_2 = f_c + 1/2T$, characterized in that said signal samples are derived from the samples of the received signal by filtering the said samples of the received signal so as to reject the component at frequency $f_c$ from the received signal.

4. A method according to claim 1 or 2 which is used in a receiver for receiving data transmitted by modulating a carrier of frequency $f_c$ at a signaling rate $1/T$, and employing a synchronization signal whose frequency spectrum includes three distinct components at frequencies $f_c$, $f_1 = f_c - 1/2T$ and $f_2 = f_c + 1/2T$, characterized in that said signal samples are derived from the samples of the received signal by filtering said samples of the received signal so as to reject the component at frequency $f_c$ from the received signal, and by taking the absolute value of the filtered samples.

5. In a synchronous data receiver of the type that includes a clock and an adaptive equalizer, a device for effecting the initial adjustment of the clock during a turn-on period in the course of which the receiver receives a clock synchronization signal followed by an equalizer training sequence, characterized in that it includes:
   sampling means for sampling the received signal,
   storage means for storing signal samples derived from the samples of the received signal, said storage means which includes a plurality of locations, each being capable of storing one of said signal samples,
   means for detecting the synchronization signal,
   means for detecting the beginning of the training sequence, and
   means responsive to the detection, in succession, of the synchronization signal and of the training sequence to derive a control signal for controlling the initial adjustment of the clock from the signal samples stored in predetermined locations in said storage means, starting from the instant the training sequence is detected.

6. In a synchronous data receiver of the type that includes a clock and an adaptive equalizer and is adapted to receive data transmitted at a signaling rate $1/T$, by modulating a carrier of frequency $f_c$, a device for effecting the initial adjustment of the clock during a turn-on period in the course of which the receiver receives a clock synchronization signal whose frequency spectrum comprises three distinct components at frequencies $f_c$, $f_1 = f_c - 1/2T$ and $f_2 = f_c + 1/2T$, followed by an equalizer training sequence, characterized in that it includes:
   sampling means for sampling the received signal at a rate $1/\tau$ which is a multiple of the signaling rate,
   filter means for filtering the sampled received signal so as to reject the component at frequency $f_c$,
   delay line means for storing signal samples derived from the samples of the filtered received signal, said delay line means comprising a plurality of locations, each being capable of storing one of said signal samples,
   means for detecting the synchronization signal,
   means for detecting the training sequence,
   means for deriving a control signal controlling the initial adjustment of the clock from the signal samples stored in predetermined locations in said delay line means, and
   means for applying said control signal to the clock in response to the detection, in succession, of the synchronization signal and of the training sequence.

7. A device according to any one of claims 5 and 6, characterized in that said signal samples stored in predetermined locations in said delay line means are those samples which precede the G samples, which are the newest samples at the instant the beginning of the training sequence is detected.

8. A device according to claim 7, characterized in that said signal samples are derived from the samples of the filtered signal by means of absolute value determining means.

* * * * *